March 18, 1958 — H. GELB — 2,826,976
VACUUM FRAME APPARATUS
Filed July 22, 1954 — 9 Sheets-Sheet 1

FIG. I

INVENTOR.
Herbert Gelb
BY
Attorney

March 18, 1958 — H. GELB — 2,826,976
VACUUM FRAME APPARATUS
Filed July 22, 1954 — 9 Sheets-Sheet 2

INVENTOR.
Herbert Gelb
BY
Attorney

March 18, 1958  H. GELB  2,826,976
VACUUM FRAME APPARATUS
Filed July 22, 1954  9 Sheets-Sheet 3

INVENTOR.
Herbert Gelb
BY
Attorney

March 18, 1958     H. GELB     2,826,976
VACUUM FRAME APPARATUS
Filed July 22, 1954     9 Sheets-Sheet 4

INVENTOR.
Herbert Gelb
Attorney

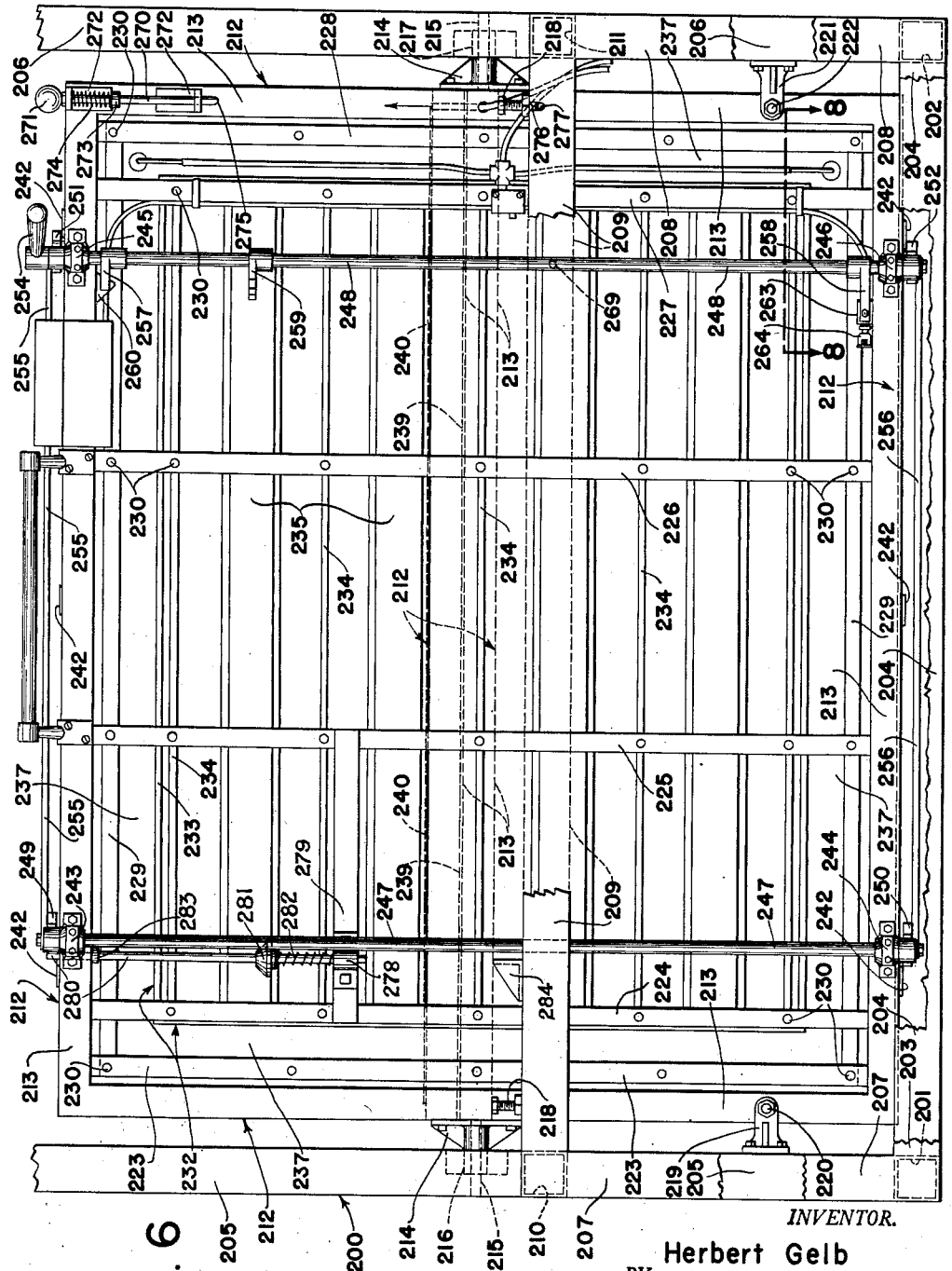

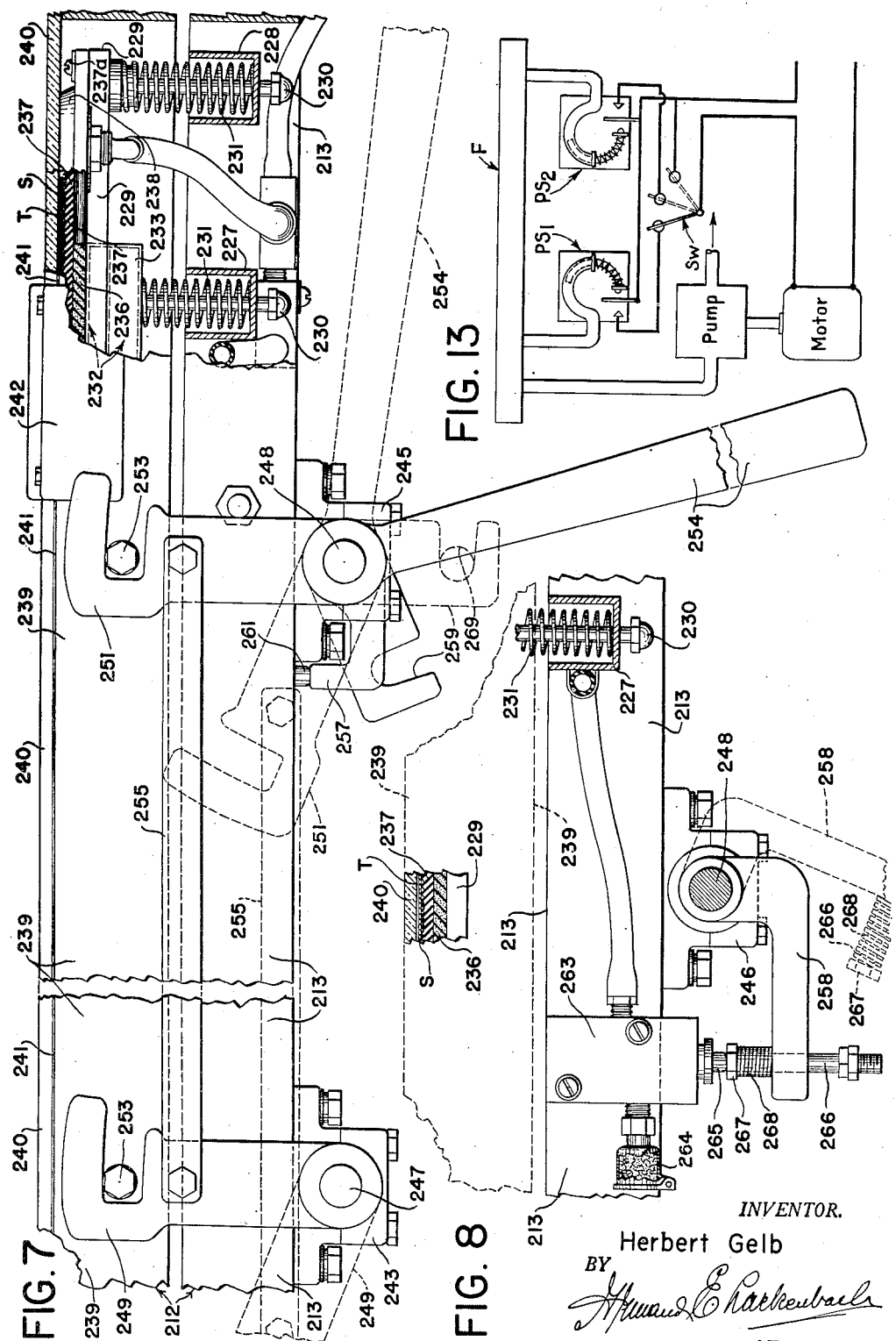

March 18, 1958     H. GELB     2,826,976
VACUUM FRAME APPARATUS
Filed July 22, 1954     9 Sheets-Sheet 8

INVENTOR.
Herbert Gelb
BY
ATTORNEY

March 18, 1958     H. GELB     2,826,976
VACUUM FRAME APPARATUS

Filed July 22, 1954     9 Sheets-Sheet 9

INVENTOR.
Herbert Gelb
BY
ATTORNEY

United States Patent Office 2,826,976
Patented Mar. 18, 1958

2,826,976

VACUUM FRAME APPARATUS

Herbert Gelb, New York, N. Y., assignor to Joseph Gelb Company, Newark, N. J.

Application July 22, 1954, Serial No. 445,008

11 Claims. (Cl. 95—76)

This invention relates generally to vacuum frame apparatus used in photography.

The present application is a continuation-in-part of my copending application for United States patent bearing Serial Number 253,880, and entitled "Illuminator," filed October 30, 1951, now Patent No. 2,760,419, dated August 28, 1956.

The general object of the invention is to provide novel and highly efficient vacuum frame apparatus for use in photography.

A particular object of the invention is to provide a vacuum frame of novel construction and means for controlling the same. The vacuum frame and its controlling means may be variously employed in photographic work. For example, the frame may be utilized as a contact printing apparatus or part thereof, as a copy holder for a camera, and as a film holder for a camera. Thus the invention contemplates broadly apparatus comprising a vacuum frame for holding one or more sheets of rigid or flexible material in intimate contact with a rigid transparent sheet, e. g., a sheet of glass, and means for controlling the frame, and, where desired, means for illuminating the frame.

Apparatus constructed according to the present invention provides a vacuum frame which may be loaded, sealed, and evacuated with a minimum of delay; which efficiently holds its vacuum; in which the degree of evacuation may be selectively predetermined, if desired; and for which a single manual operation is required for sealing and initiating evacuation or for stopping evacuation and unsealing.

Herein the invention is mainly described and illustrated in the form of a contact printing apparatus or part thereof. Such full understanding of the invention may be had from the discussion of its employment in connection with contact printing that but little additional discussion is presented with respect to its other possible employments, as those related to copy and film holding in connection with a camera.

Where a vacuum frame is involved as a component of a contact printing apparatus, an indispensable additional component is a means for evacuating the frame; and, of course, since the apparatus is inoperable as a printer without a light source, such source may be regarded as a further indispensable component even though there is no mechanical connection between the source and the rest of the apparatus. Herein, accordingly, the present invention, used as a contact printing apparatus comprises a vacuum frame, usually referred to as a vacuum printing frame, means for evacuating the frame, and a suitable light source, as well as certain general improvements in the apparatus and particular improvements in each of, and in combinations of, the three main components.

In the art, a vacuum printing frame usually comprises a pan having a blanket of resilient material peripherally secured therein, and a cover member including, as a major part thereof, a sheet of transparent glass. The functions of the cover member are hermetically to seal the frame and to permit light to impinge upon photographic materials, such as transparencies and sensitized sheets, carried within the frame. The cover member may engage directly the edges of the pan to form the requisite seal, or may engage part of the blanket, as, for example, a marginal bead provided thereon, the bead usually being contacted and depressed by the glass sheet when the cover member is in closed position. Means for locking the cover member in such position are commonly provided.

Means for evacuating the printing frame may include a pump and a motor for driving it. In addition to a pump and a motor, a vacuum reserve tank is sometimes employed as a means of evacuating the printing frame; but, of course, when pressure within the reserve tank increases sufficiently as a result of repeated use of the tank for evacuating the frame, the reserve tank must be re-evacuated, thereby calling into use the fundamental pump and motor.

It will be readily understood that, while a source of light is indispensable for operation of the contact printing apparatus, the light source may or may not be mechanically connected with the rest of the apparatus, and may comprise any one of a number of different structures. Also the printing frame may be illuminated by the light source in different ways: for example, one or more stationary lights may be utilized; or advantage may be taken of relative movement between the light source and the printing frame to effect an illumination of the latter resulting, in effect, from a sweeping of the frame by a bundle of light rays.

In operation photographic materials, such as transparencies and sensitized sheets, are loaded in known manner upon the blanket or equivalent element of the pan; the printing frame is hermetically sealed by the closing of the cover member, and such member is usually secured in closed position by locking means engaging both the pan and the member; the printing frame is evacuated, effecting a bellying of the blanket toward the glass sheet and resulting in clamping the photographic materials together in intimate contact; and then the printing frame is illuminated through the glass sheet of the cover member for photoprinting.

Heretofore in contact printing apparatus including as part thereof a vacuum printing frame various problems common in the art have not been satisfactorily overcome; and the present invention seeks to provide means for the adequate solution of many of such problems. That a full understanding of the present improvements may be had, certain problems relating to contact printing in vacuum, and which such improvements solve, are briefly set forth below.

While a reliable seal between the pan or part of its blanket and the cover member or the glass sheet thereof is relatively easy to attain, considerable difficulty is usually experienced in preventing leakage in the apparatus provided for evacuating the printing frame. Maintenance of vacuum may be attained, even if small leaks exist in an associated air line, by the undesirable expedient of operating a pump continuously. This expedient is plainly undesirable for reasons other than those of cost: a continuously operating pump, even working against a leakage, may so dangerously reduce the pressure within the printing frame that, if photographic material of glass is carried therein, such material may be fractured. In order to avoid continuous operation of the pump a vacuumstat may be included in the evacuation apparatus for controlling operation of the pump. Where there is a leak in the air line, or, as is almost invariably the case, a feedback through the pump itself, and a vacuumstat is part of the evacuation apparatus, the pump automatically operates intermittently. Initially, the pump, controlled by the vacuumstat, evacuates the printing frame until a predetermined subatmospheric pressure therein is attained; then the pump stops. However, shortly thereafter, due to a line leakage (usually in a valve) or to feed-back through the pump, the pressure rises to a point at which the vacuumstat effects further operation of the pump, as by energizing a motor provided for driving the pump. An object of the invention is to provide means for preventing feed-back through the pump into the printing frame, and, also, to provide an air line or lines less subject to leakage. A further object is to provide improved means for sealing the printing frame and for locking the cover member in sealing position.

Different subatmospheric pressures are desired within the printing frame depending upon the nature of the photographic material carried therein. For example, a suitable pressure for use with film is lower than that suitable for use with glass. It is an object of the invention to provide novel means for predetermining the pressure existing within the printing frame when the latter is loaded with photographic materials to be exposed.

In printing frames generally known the loss of time between the sealing of the frame and the attainment of suitable subatmospheric pressure therein has materially reduced production of contact prints. Immediately the frame is sealed the pressure therein is, of course, atmospheric; and the amount of air which must be withdrawn to attain the desired subatmospheric pressure depends upon the size of the sealed space which is enclosed, at least in part, by the blanket of the pan and the glass sheet of the cover member; and plainly the time required for the evacuation is a function of the amount of air present within the frame immediately the same is sealed. Usually the space is considerable at atmospheric pressure, and the time required to exhaust sufficient air so that the photographic material in the frame is clamped together in intimate contact for exposure is also considerable. Another object of the invention is to provide means independent of the pump for urging the blanket toward the glass of the cover member, so that, immediately the printing frame is sealed, only a very small volume of air at atmospheric pressure is present therein, and evacuation of the frame to provide a suitable subatmospheric pressure requires an extremely short period of time.

The sealing of the printing frame, by closing and locking the cover member, together with a subsequent initiation of the evacuation of the frame is undesirably time-consuming. Thus it is a particular object of the invention to provide a vacuum printing frame having sealing means and evacuation means, the latter means being actuated by the former means, so that evacuation is automatically initiated in response to the sealing of the frame. In connection with this object of the invention an improvement is provided whereby the printing frame may be sealed, its cover member locked in sealing position, and the evacuation of the frame initiated, all simultaneously, and by a single manual operation. Further, the same improvement provides means whereby a reversal of said manual operation simultaneously arrests evacuation, if that process is taking place (e. g., the pump, if controlled by a vacuumstat, may not be operating), unlocks the cover member, and sets the interior of the frame into communication with the atmosphere.

The present invention contemplates contact printing apparatus having a vacuum printing frame which may be horizontally disposed for loading and unloading and vertically disposed for printing, and two structural forms are described and illustrated herein, both forms being within the scope of the invention. Where the printing frame is relatively small and of light weight the cover member, with its glass sheet, may be hingedly mounted on the pan portion of the frame, and the cover member may be raised and lowered by hand with ease. Where the printing frame is relatively large and of considerable weight the cover member may be associated with an elevating mechanism for moving the member vertically with respect to the pan portion; in this form of the invention there is no physical engagement between the cover member and the pan portion when the frame is opened for loading and unloading. A particular feature of the invention is a construction which permits the cover member to be raised and lowered by elevating mechanism when the pan portion is horizontally disposed, but which also permits the cover member to pivot with the pan portion, so that the printing frame may assume a vertical position, when the two main parts of the frame are locked together.

Another feature of the invention is a means for counterbalancing a printing frame pivotally mounted on a main frame of a contact printing apparatus whereby a gentle swinging motion of the printing frame is assured. It will be manifest that the printing frame, having not only a partly glass cover member but possibly also carrying glass photographic material therein, must be brought to rest at either a horizontal or a vertical position without violence.

The invention also contemplates a contact printing apparatus the illumination of which is had by means of a traveling linear light source. This form of apparatus is described herein as a first embodiment of the invention, and comprises a main frame having a vacuum printing frame pivotally mounted thereon, an elongated gaseous arc light mounted on the main frame for movement relative to the printing frame when the latter is disposed in a particular manner, e. g., vertically, the arc light also being vertically disposed, and evacuation means for the printing frame also mounted on the common main frame.

Another feature of the invention where the same is embodied to include a pivotally mounted printing frame are means for preventing premature swinging of the pan portion of the printing frame from a loading position, i. e., for preventing such swinging of the pan portion until the cover member is not only closed thereon but locked thereto. Herein, in one embodiment shown, the means for locking the cover member on the pan portion of the printing frame operate to lock the pan portion against movement when such means are in nonlocking position with respect to the cover member.

Another feature of the invention where the same is embodied to include a pivotally mounted printing frame are means for preventing unlocking of the cover member from the pan portion while the two main parts of the printing frame are in printing position. This feature is of considerable importance where the printing position is vertical, for unlocking of the cover member from the pan portion, either by accident or otherwise, during exposure, could result in much damage. For example, the act of unlocking the cover member could result in immediate loss of vacuum within the printing frame: the photographic materials carried therein would no longer be clamped in position and would, of course, collapse; and, if one or more elements carried within the frame were of glass, shattering might well take place. With respect to the present feature of the invention the means for preventing unlocking of the cover member during exposure operate automatically in response to the angular disposition of the printing frame and do not require the attention of the operator of the apparatus.

Included herein are several modifications of apparatus for controlling the evacuation means provided for the vacuum printing frame.

Another feature of the invention is the inclusion within any of the several evacuation systems shown herein of filters to prevent dust from entering and damaging certain parts of the systems.

These and other objects, features, and advantages of the invention will be more fully understood from the following detailed description and from the drawing.

In the drawing:

Fig. 1 is a front elevational view of the embodiment showing the printing frame horizontally disposed for loading and unloading.

Fig. 2 is an enlarged front elevational view of the embodiment showing the printing frame vertically disposed for printing.

Fig. 3 is the section 3—3 of Fig. 1.

Fig. 4 is the section 4—4 of Fig. 1.

Fig. 5 is a diagram illustrating an exemplary arrangement of cooperating electrical and pneumatic circuits and parts which may form part of the present embodiment.

Figs. 6 through 8 illustrate a second embodiment of the invention in the form of a contact printing apparatus having a pivotally mounted printing frame and which may be used with any suitable light source.

Fig. 6 is an elevational view of the embodiment showing the printing frame vertically disposed for printing. Fig. 6 is a front view of the embodiment insofar as the operator is concerned; however, the back or opaque part of the printing frame is shown in this figure, wherein the direction of view is toward the illuminating means (not shown).

Fig. 7 is a fragmentary and much enlarged top plan view of the embodiment with the printing frame in vertical or printing position. In Fig. 7 many parts shown in Fig. 6 are omitted.

Fig. 8 is the section 8—8 of Fig. 6.

Figs. 9 through 13 are diagrams illustrating modifications of cooperating electrical and pneumatic circuits and parts which may be incorporated in one or more embodiments of the invention.

Figure 9:
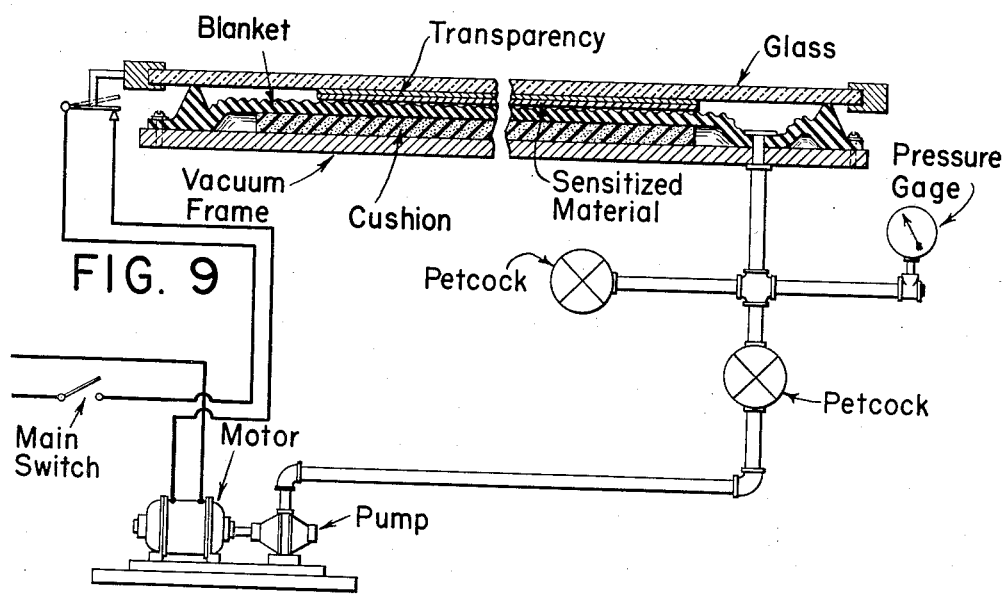

Fig. 9 includes a conventionalized pictorial elevational cross section of a typical vacuum printing frame built according to the present invention.

A first embodiment of the invention is illustrated in Figs. 1 through 5. This embodiment comprises a contact printing apparatus including, as a unit mounted on a common main frame, a vacuum printing frame, means for evacuating the frame, and means for illuminating the frame. Various features incorporated in this embodiment are also included in other embodiments subsequently discussed. However, this first embodiment is unique in that the means for illuminating the printing frame is a linear light source adapted to move with respect to the frame and thereby sequentially illuminate the same by sweeping it with a bundle of light rays forming a particular pattern.

Generally the form of contact printing apparatus illustrated herein in Figs. 1 through 5 is similar to an apparatus disclosed in my copending application for United States patent bearing Serial Number 253,880, and entitled "Illuminator," filed October 30, 1951, and of which the present application is a continuation-in-part. In accordance with a division made August 1, 1952, claims in the parent case relate to specific illumination means; and, while such means is illustrated and described in this continuation-in-part, it is not claimed herein. The specific illumination means covered in the copending application identified above is preferred as a part of the contact printing apparatus illustrated in the figures cited above; but it will be understood that any other suitable traveling light source may form the illumination means of the present first embodiment.

In the first embodiment, as well as in another subsequently described, the printing frame is pivotally mounted on a main frame so that the former may be horizontally positioned for convenient loading and unloading and vertically positioned for printing.

Figure 1:
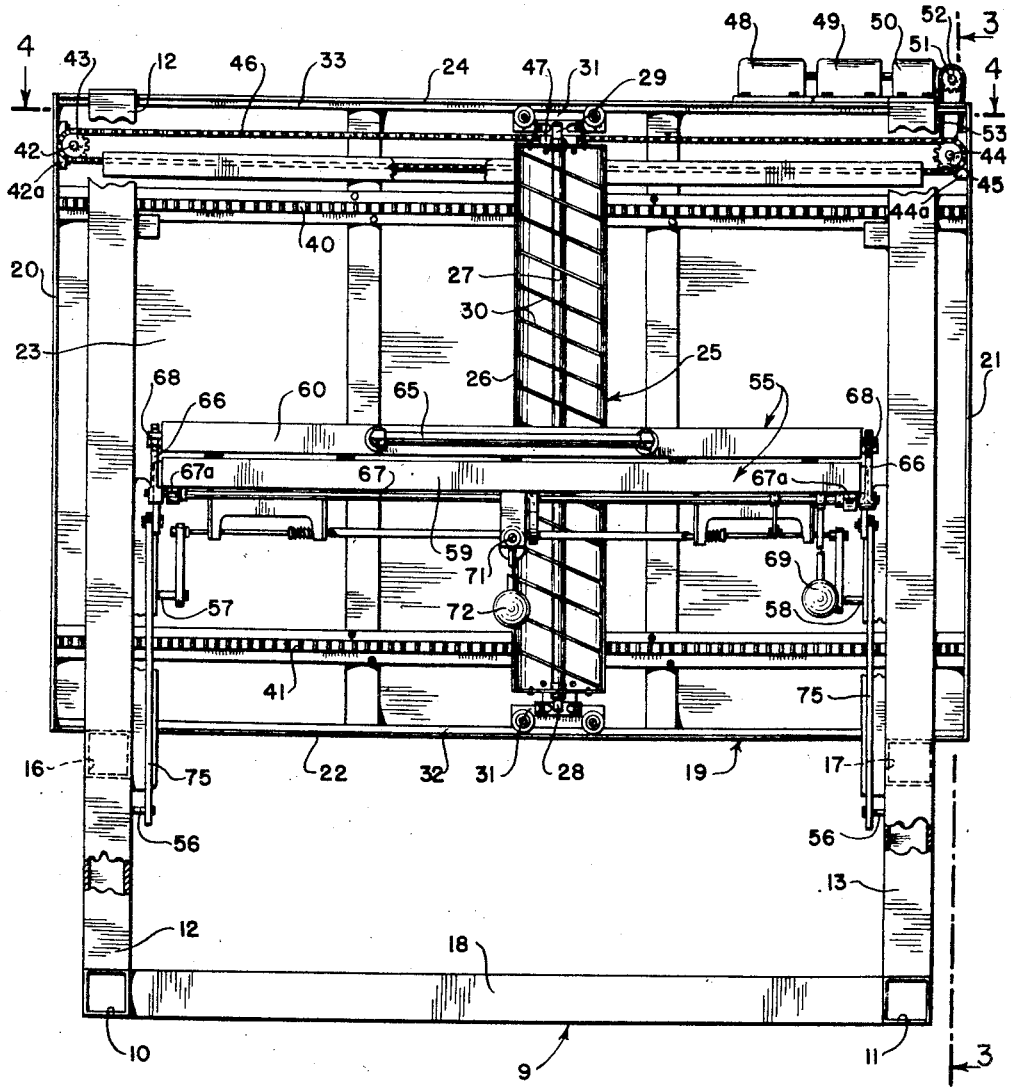
Figs. 1 through 5 illustrate a first embodiment of the invention in the form of a contact printing apparatus comprising a pivotally mounted printing frame and a traveling light source for illuminating the frame.
Figure 2:
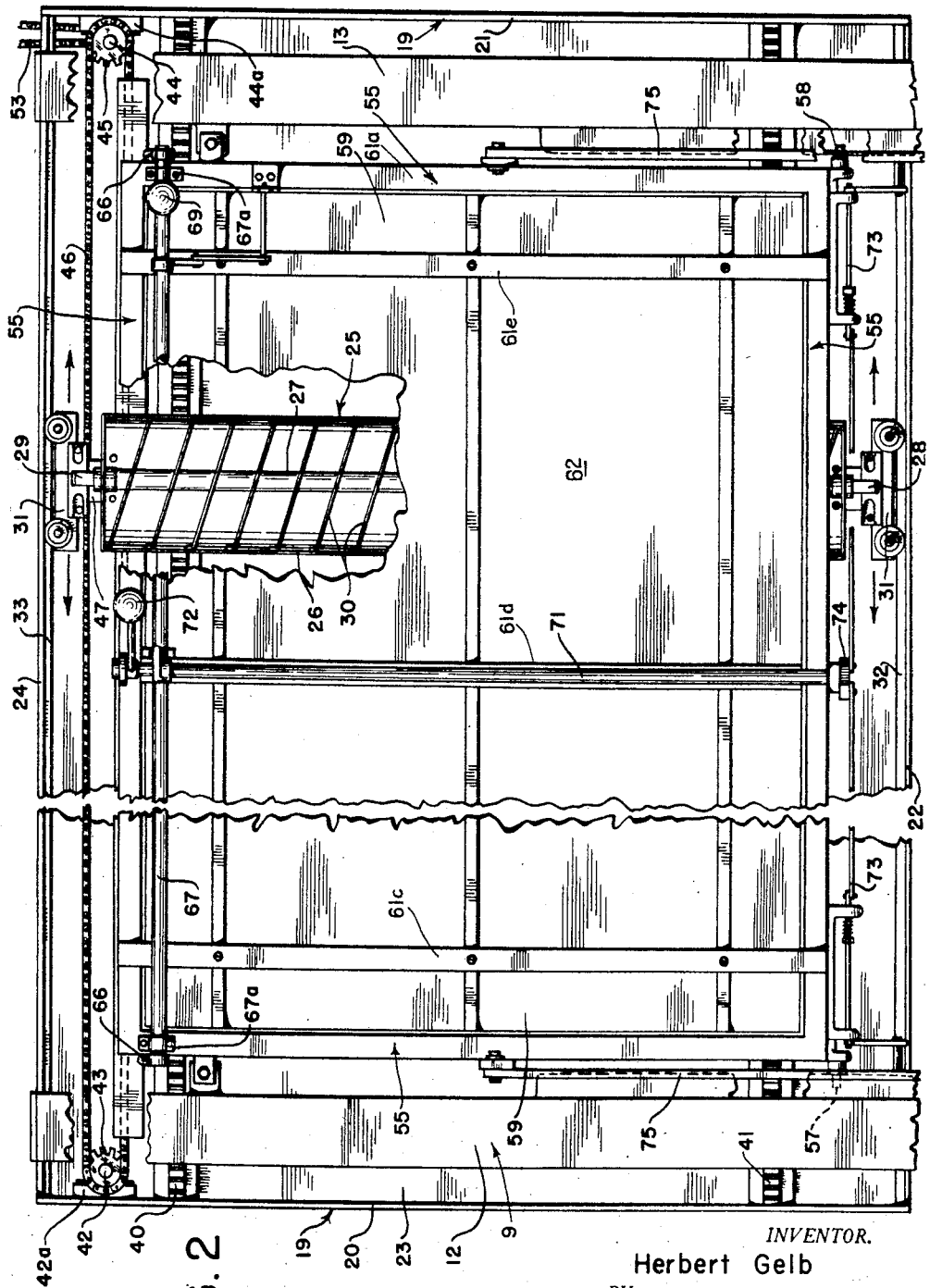
Figure 3:
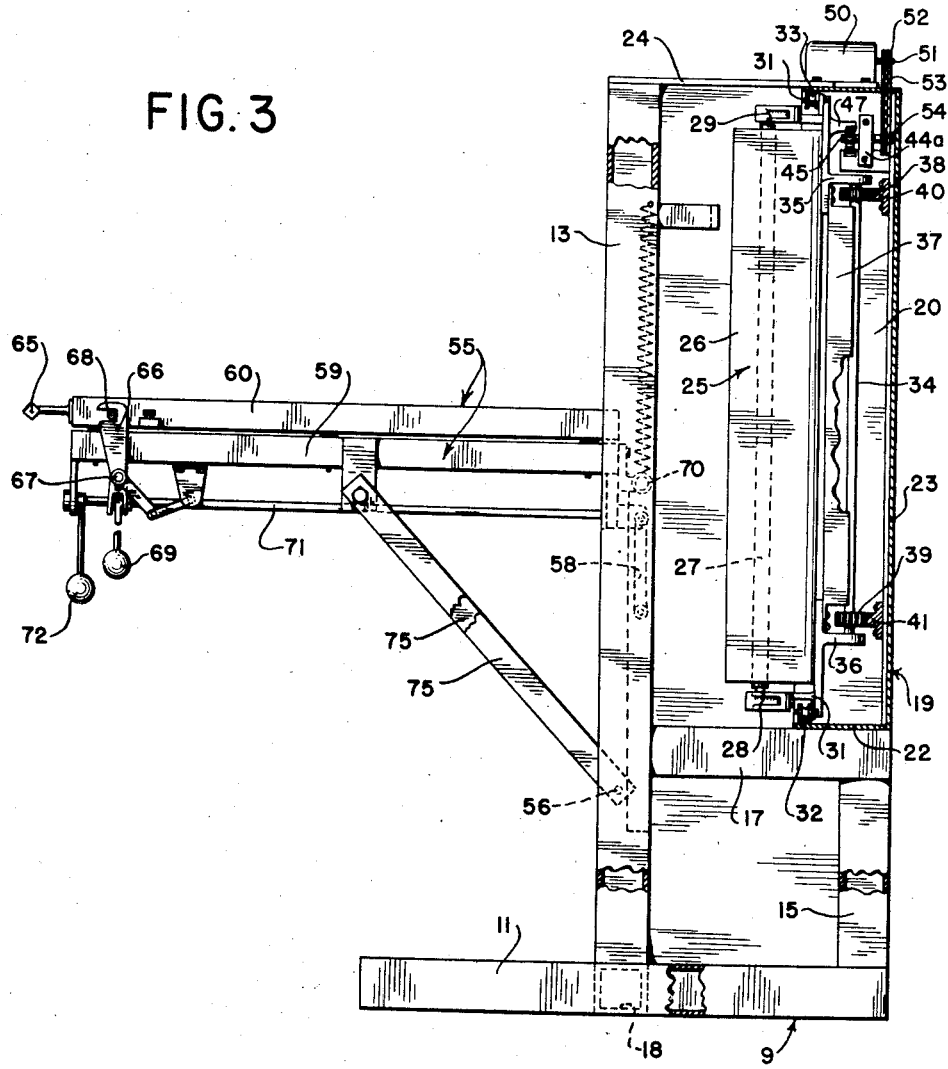

The main frame is designated, in its entirety, 9; and may be seen wholly or in part in Figs. 1 through 4. The main frame comprises pedal members 10 and 11, these being respectively to the left and to the right in Figs. 1 and 4; frontal uprights 12 and 13, also respectively to the left and to the right in Figs. 1 and 4; much shorter uprights 14 and 15, respectively behind uprights 12 and 13 (upright 14 is seen only in Fig. 4, and therein in dotted lines; upright 15 is seen in both Figs. 3 and 4); and horizontal braces 16 and 17, respectively tying together uprights 12 and 14 on the left, and uprights 13 and 15 on the right, as in Fig. 4; and another horizontal brace 18, best seen in Fig. 1, tying together the pedal members 10 and 11. In the structure shown the rear ends of braces 16 and 17 respectively rest upon the tops of uprights 14 and 15 (Fig. 3 shows the arrangement of brace 17, which is similar to that of brace 16, which is obscured in this figure).

The elements 10 through 18 are preferably of tubular steel stock of square cross section, as indicated. The elements of the main frame may be conveniently secured together by welding.

Mounted on the rear of the main frame is a box 19, comprising side panels 20 and 21 (left and right, respectively, in Figs. 1 and 4), a floor 22, a rear panel 23, and a roof 24 (see Figs. 1 through 4). The box 19, the front of which is unwalled, may be constructed of sheet metal elements welded together, and may also be welded, as a unit, to the main frame. It will be noted in Fig. 3, particularly, that the box actually rests upon braces 16 and 17, and that the roof 24 extends forwardly and surmounts the frontal uprights 12 and 13, to which the front edge of the roof is suitably secured.

The photographic rays of the light source, presently to be described, emanate from a carriage structure designated, in its entirety, 25, and which is adapted to be moved from side to side of, and within, box 19, and transversely with respect to the main frame. The carriage structure comprises a housing 26, unwalled at the front, and the inside of the housing is highly polished so that it may serve as a reflector; a tubular gaseous arc light 27 disposed vertically within the housing between terminals 28 and 29; a plurality of baffles 30 extending diagonally across the unwalled front portion of the housing and in front of the light; and trucks 31 at the lower and upper extremities of the carriage, the lower truck 31 rollably engaging a rail 32 secured to the floor 22 of box 19, and the upper truck 31 similarly engaging another rail 33 secured to the underside of the roof 24 of the box. See Figs. 1, 2, and 3. The two rails provide means for accurately guiding the carriage structure during its travel from side to side of the box 19 and the main frame.

The carriage structure, as best seen in Figs. 1 and 3, is elongated vertically. At the rear of the carriage is a vertically disposed shaft 34, journaled in brackets 35 and 36, respectively secured to the upper and lower portions of the carriage. The carriage structure is rigidly braced by a channel 37 which extends between the brackets 35 and 36, each of which is also rigidly secured to one of the trucks 31. See Fig. 3, particularly. It will be understood that considerable heat is generated by the arc light; and the channel 37 is provided to reinforce the housing 26 against stresses tending to distort it.

Mounted on shaft 34 near bracket 35 is a pinion 38; and also mounted on the shaft near bracket 36 is a like pinion 39. Secured in suitable manner to the front side of the rear panel 23 of box 19 are two racks 40 and 41, both horizontally disposed and extending from side to side of the box, the former being near the roof 24 and the latter near the floor 22. Racks 40 and 41 are respectively engaged by pinions 38 and 39. The pinions are keyed to shaft 34, and, in consequence, turn together; thus the carriage is prevented, during its travel, from tilting toward either side of box 19. See Figs. 1 through 4.

On a stub shaft 42 supported by a bracket 42a secured to the upper portion of side panel 20 within box 19 is a sprocket 43; and on a like stub shaft 44 supported by a bracket 44a secured to the upper portion of side panel 21 within the box is a like sprocket 45. The sprockets are positioned on a common level within the box, as best shown in Figs. 1 and 2, and are joined by a chain 46. The chain, in the form of a loop, as seen in Fig. 1, is attached to a bracket 47 secured to the rear upper portion of the carriage 25 (see, particularly, Figs. 3 and 4).

Mounted on top of the roof 24 of box 19, to the right as seen in Fig. 1, is a motor 48, a reducer 49, and a direction changer 50 having a drive shaft 51, and a sprocket 52 mounted on said drive shaft. A chain 53 connects sprocket 52 with another sprocket 54 mounted within box 19 on stub shaft 44, on which is mounted sprocket 45, mentioned above. Thus the motor serves to actuate sprocket 45, which in turn drives chain 46 thereby causing carriage 25 to move sidewise in box 19. See, also, Figs. 3 and 4.

It will be understood that in the structure shown the motor 48 must be reversible. Limit switches, not shown in the pictorial Figures 1 through 4, may be provided at appropriate stations on the apparatus for the purpose of signaling the arrival of the light source at one or the other side of the box 19 so that means responsive to actuation of said switches may operate to stop the movement of the light source, to reverse its direction of movement, and, if desired, to dim the light or completely de-energize it if it is to remain for some time at a particular side of the box. The limit switches may, of course, be positioned so that they can be actuated by the carriage 25 or part thereof.

An exemplary electrical and pneumatic arrangement suitable for this first embodiment is shown diagrammatically in Fig. 5, and is subsequently described in detail.

The printing frame of the present embodiment is designated, in its entirety, 55. This frame is seen disposed horizontally for loading and unloading in Figs. 1, 3, and 4, and disposed vertically for printing in Fig. 2, this latter figure being somewhat enlarged. The two main parts of the printing frame are the pan portion and a cover member hingedly mounted on the former (see below). The printing frame is pivotally mounted at 56 on uprights 12 and 13 of the main frame 9 of the apparatus, as best shown in Figs. 1 and 3; and pivotally and slidably mounted by means of studs 57 and 58 in suitable slots provided in the same uprights. Fig. 3 is best illustrative of the manner in which the printing frame may be swung between horizontal and vertical positions. The swinging movement of the printing frame is centered at 56; the studs 57 and 58, while rotating, slide downward or upward within the slots abovementioned.

Figure 4:
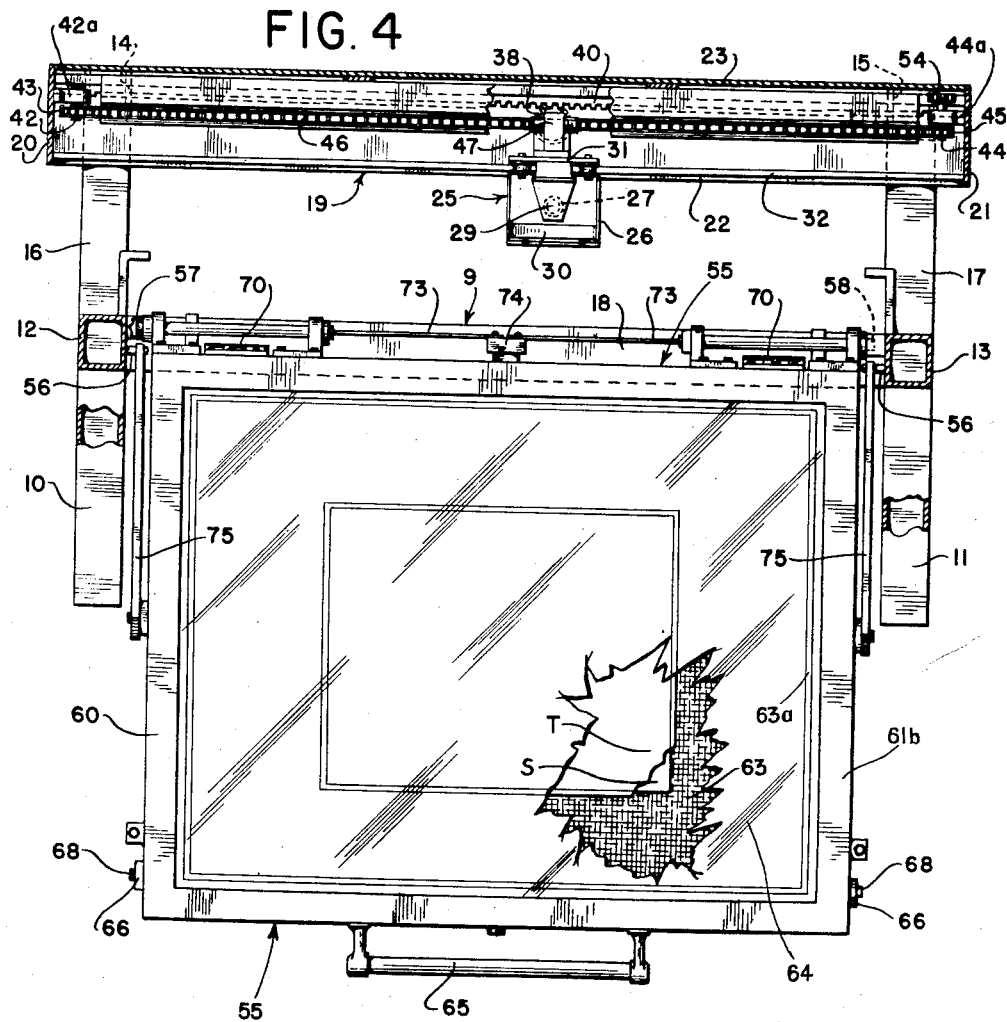

The pan portion of the printing frame is indexed 59, and the cover member, which is hingedly mounted thereon, 60 (Figs. 1 and 3). The basic elements of the main parts, i. e., the pan and the cover, respectively, of the printing frame are like rigid fenestrated rectangular frames 61a and 61b. That side of the pan portion which is away from the cover member is best illustrated in Fig. 2. Rigidly mounted on frame 61a are several (here three) members which extend across the fenestration of the frame, these members being indexed 61c, 61d and 61e, from left to right in the last named figure. A rigid rectangular sheet 62 is mounted on members 61c, 61d, and 61e, and within the fenestration of frame 61a, as shown in Fig. 2. Preferably the sheet 62 is not rigidly mounted to the members identified, but is resiliently mounted thereon and urged away from the members by springs. (The preferred mounting, not illustrated with respect to the first embodiment of the invention, is clearly shown in Figs. 7 and 8, which relate to a second embodiment; however, it will be understood that the preferred mounting may be used in both embodiments. Such a mounting is subsequently described in detail.) The frame 61a and the sheet 62 together comprise the pan proper of the pan portion of the printing frame. Mounted on that surface of sheet 62 opposite to the surface shown in Fig. 2 is a blanket of resilient material which is secured to the sheet only peripherally. Only a fragment of the blanket, which is indexed 63, and which is preferably a sheet of rubber having a corrugated surface for engaging photographic materials placed thereon, is shown in the drawing (see Fig. 4). The blanket may or may not be provided with a cushion interposed between the nonmarginal portion of the blanket and the sheet 62; a construction wherein the printing frame blanket is cushioned is illustrated in Figs. 8 and 9. The blanket 63 is provided with a marginal bead 63a; and the fenestration of the frame 61b of the cover member 60 is sealed with a glass sheet 64. The bead 63a, seen only in Fig. 4, is shown in solid lines, but without shading, to emphasize the fact that it is beneath the glass sheet 64. When the cover member is in closed position the bead 63a and the glass sheet 64 make contact, and the bead, being of resilient material, is actually depressed somewhat so that a firm seal is established between the bead and its blanket and the glass sheet, providing an envelope which is hermetically sealed and which may be evacuated.

In Fig. 4, a plan view of the apparatus showing the printing frame in horizontal position, the glass sheet 64 is seen to be broken away so that the corrugated surface of the blanket 63 may be seen; also, in this figure a transparency T and a sheet of sensitized material S are indicated. The latter lies directly upon the corrugated surface of the blanket and is covered by the transparency. Of course, when the envelope formed by the blanket, its bead, and the glass sheet is evacuated, the nonmarginal portion of the blanket, which is not secured to the sheet 62, bellies toward the glass sheet 64 and clamps the photographic materials T and S in intimate contact.

A handle 65 is provided on one edge of the cover member 60 (Figs. 1, 3, and 4). The handle may be employed for raising and lowering the cover member alone when the latter is not locked to the pan portion of the printing frame; and, of course, may also be used for swinging the printing frame when the latter is sealed.

On either side of the printing frame is a latch 66. Each latch is keyed to a shaft 67 which extends across the printing frame and is journaled in pillow blocks 67a, as best shown in Fig. 2. On either side of the cover member 60 is a pin 68 (Figs. 1 and 4; but see, particularly, Fig. 3 wherein the latch and pin arrangement is best illustrated). Each pin 68 is adapted to be engaged by one of the latches. A handle 69 is provided for rotating shaft 67 whereby latches 66 may be brought into and out of engagement with pins 68 respectively for the purposes of locking and unlocking the cover member with respect to the pan portion of the printing frame.

The handle 69 may be utilized to control evacuation of the printing frame, as will be more particularly described below.

The cover member 60 is hingedly attached to the pan portion 59 in any suitable manner, as at 70 in Fig. 3. When the printing frame is swung into vertical or printing position, as shown in Fig. 2, it is desirable to lock it temporarily in such position to avoid any accidental swinging of the frame away from the illuminator during an exposure. A means for so locking the printing frame in vertical or printing position comprises a shaft 71, disposed at right angles to shaft 67 (see above) and suitably journaled in pillow blocks or other bearings mounted on frame 61a (see Fig. 2); a handle 72 for rotating shaft 71; and a pair of spring-controlled latches 73, each being pivotally connected to a member 74 keyed on shaft 71 whereby rotation of shaft 71 operates to actuate the latches. Each latch is adapted to enter and to be retracted from a suitable aperture, not shown, in the main frame when the printing frame is in vertical or printing position. See, particularly, Fig. 2; also, Figs. 1, 3, and 4.

Braces 75, forming that part of the printing frame which is pivotally mounted on the main frame at 66, serve to prevent collapse of the frame when it is disposed horizontally for loading and unloading.

It will be readily understood from the foregoing that the embodiment of the invention described above is a contact printing apparatus comprising a vacuum printing frame adapted to be swung into horizontal position for loading and unloading, and into vertical position for printing, and a vertically disposed linear light source adapted to travel normal to its long dimension in a plane parallel to that of the printing frame when the latter is in printing position. Obviously, so long as the respective planes of the printing frame and of the path of travel of the light source remain parallel during exposure of photographic materials carried within the frame, it is immaterial that the printing position of the frame or the disposition of the light source be vertical, for the invention may readily, if perhaps less conveniently, be embodied in apparatus wherein the printing position is horizontal or otherwise.

Figure 5:
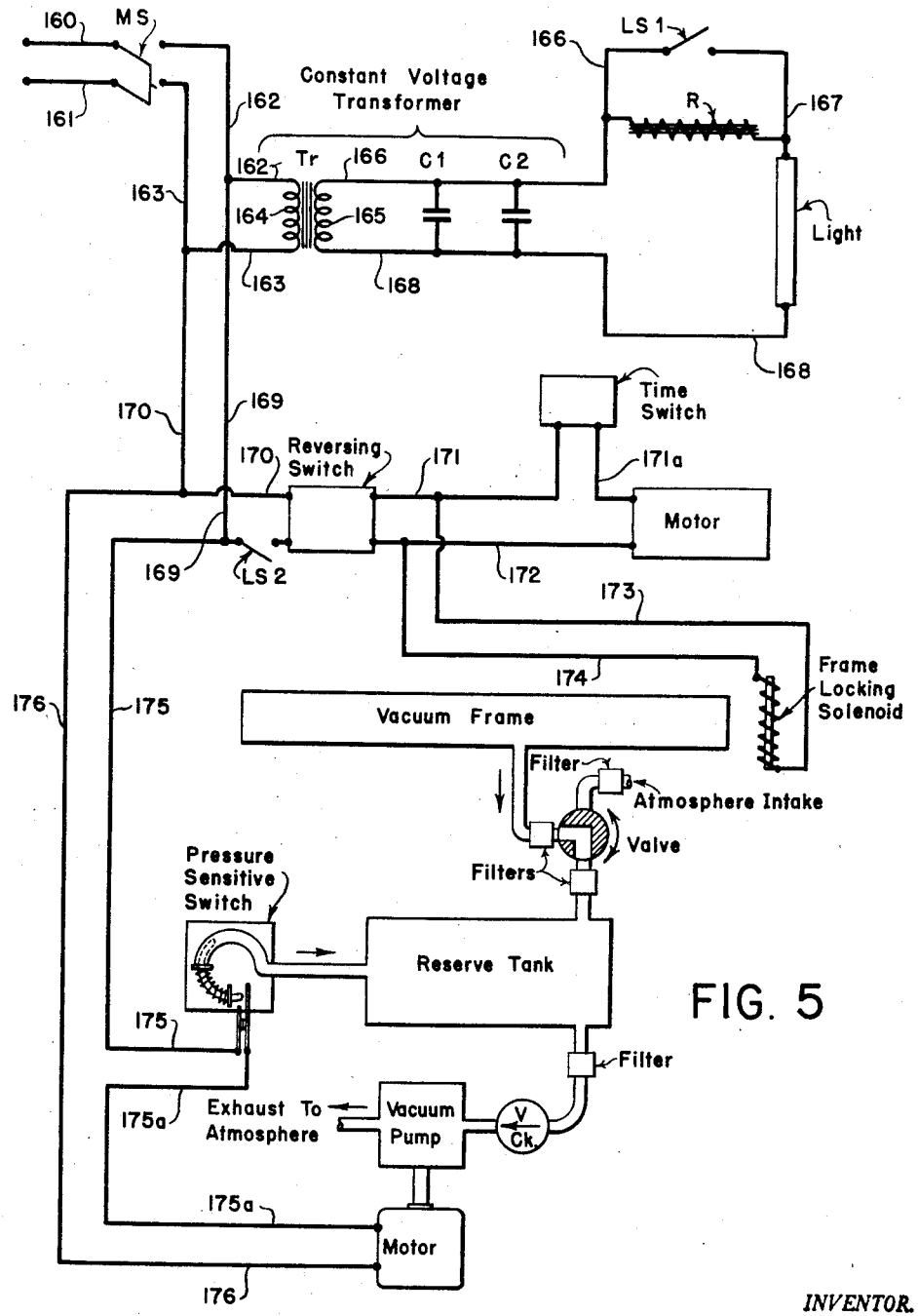

Fig. 5 shows, diagrammatically, further features of the first embodiment of the invention not included in the pictorial Figures 1 through 4. Mainly Fig. 5 is concerned with cooperating electrical and pneumatic circuits and parts. It should be made clear here that features shown in Fig. 5 may be incorporated in other embodiments of the invention, and that, generally, various features of the invention illustrated both pictorially and diagrammatically in the several figures are not necessarily limited to a particularly described embodiment; nor is a particularly described embodiment required to embrace every feature mentioned in connection therewith.

In Fig. 5 the reference numerals 160 and 161 identify the two legs of an A. C. house line. MS is a main switch. Lines 162 and 163, connected to the main switch, are joined through primary 164 of a constant voltage transformer T$r$, the secondary of which is designated 165. Line 166 leads from one terminal of the secondary 165 to a limit switch LS$_1$, from which a line 167 leads to one terminal of an elongated gaseous arc light, such as 27 (see above, and Fig. 1). The other terminal of the arc light (labeled in Fig. 5) is connected by a line 168 with the other terminal of secondary 165. C$_1$ and C$_2$ are the usual condensers. It will be noted that limit switch LS$_1$ is bypassed by resistance R, which bridges lines 166 and 167.

When the carriage, such as 25, arrives at either of the two sides of box 19, and therefore slightly beyond the printing frame, a limit switch such as LS$_1$ may be actuated in any suitable manner which is responsive to the presence of the light source at a side of the box whereby the switch is opened, whereupon the light will be dimmed, as its energy then will be received solely through the resistance R. As soon as the limit switch closes again, as in response to the withdrawal of the light source from a side of the box, the light regains the intensity required for photographic purposes. This arrangement is to prevent excessive use of current when the light is not employed in printing and also to avoid having to shut down the light altogether and then wait until it regains proper intensity for a next run of the carriage 25.

A line 169, connected to line 162, leads to another limit switch LS$_2$, and to one side of a reversing switch (labeled). A line 170, connected to line 163, leads directly to the same side of the reversing switch. A line 171 leads from the other side of the reversing switch to a time switch (labeled), from which a line 171$a$ leads to the motor 48 (labeled, Fig. 5). From the motor a line 172 returns to the reversing switch.

A limit switch such as LS$_2$ may be provided at either side of the box 19 and may be arranged to control the reversing switch so that in the presence of the carriage 25 at a side of the box the motor is reversed to drive the carriage to the other side of the box. The time switch is provided so that the carriage is not abruptly reversed in its travels.

It is highly desirable that the printing frame be locked in printing position while the light source is traveling from side to side of the box so as to avoid accidental spoilage of the work being done or actual damage to the apparatus, as by, for example, a swinging of the printing frame into actual engagement with the moving light source and related parts. One manually controllable means for locking the printing frame in printing position has been previously described. As a safety measure the temporary locking of the printing frame in printing position may be governed by the energization of the motor. For example, in Fig. 5, a frame locking solenoid (labeled), which may actuate a latch for locking the printing frame in a particular position relative to the main frame, is indicated, the solenoid being connected in parallel with the motor by means of lines 173 and 174, which respectively connect with lines 171 and 172. Thus when the motor is energized, and the light source is traveling from side to side of the box, with the printing frame in printing position, the solenoid is also energized. The solenoid may be utilized in such manner that when its core is in retracted position the printing frame cannot be moved from printing position.

A line 175, connected to line 169, leads to a pressure-sensitive switch (labeled) and line 175$a$ leads therefrom to another motor arranged to drive a vacuum pump (both motor and pump labeled; see the lower part of Fig. 5). The pressure-sensitive switch is designed in known manner to remain closed in the presence of an actuating pneumatic pressure greater than a predetermined subatmospheric amount, and to open in the presence of, or less than, such pressure.

The vacuum frame (labeled) is connected through a valve (labeled) with a vacuum reserve tank or chamber (labeled), the latter being connected through a check valve (symbol) with the vacuum pump. The exhaust to atmosphere of the pump is entered on the drawing. The valve labeled in Fig. 5 may be arranged in any suitable manner to be actuated by handle 69 (see above), which is provided for rotating shaft 67 whereby latches 66 may be brought into and out of engagement with pins 68 for the respective purposes of locking and unlocking the cover member 60 with respect to the pan portion 59 of the printing frame. When the cover member is locked the valve permits communication between the vacuum frame, the reserve tank or chamber, and the vacuum pump; when the cover member is unlocked the valve blocks the line leading therefrom through the reserve tank or chamber to the vacuum pump, and permits communication between the vacuum frame and the atmosphere.

Immediately the printing frame is sealed, as by the locking of the cover member with respect to the pan portion, the instantaneous pressure within the printing frame is, of course, atmospheric, and, consequently, more than any predetermined subatmospheric pressure. If, under these circumstances, the main switch MS is closed, the motor for driving the vacuum pump will immediately begin to operate, for the pressure-sensitive switch will also be closed and the circuit accordingly complete. If the pneumatic arrangement is as indicated in Fig. 5 the pump will operate until the pressure within the entire system (the vacuum frame, the reserve tank or chamber, the pressure-sensitive switch, and the several air lines) diminishes to that predetermined subatmospheric pressure mentioned above; at that time the pressure sensitive switch will open and the pump motor will stop operating. If the valve is operated to set the vacuum frame into communication with the atmosphere, as by the unlocking of the cover member of the printing frame, the air line leading to the reserve tank or chamber, the pressure-sensitive switch, and the pump will be blocked, as described above; and the pressure-sensitive switch will ordinarily remain open if no leaks are present. However, it will be seen that once the printing frame is exposed to the atmosphere and then resealed, and the valve reset as shown in Fig. 5, the pressure within the whole system will be slightly greater than the predetermined subatmospheric pressure due to the influx of air from the printing frame. Assuming the main switch still to be closed, the motor for driving the pump will begin to operate in response to the resetting of the valve following resealing of the printing frame. The duration of operation of the pump motor will be short: in fact it will be merely long enough to compensate for the additional pressure received into the system from the printing frame. Plainly, then, where a vacuum reserve is to be used several times for evacuating the printing frame, so that the pump may remain idle, the predetermined subatmospheric pressure should be very low and the capacity of the vacuum reserve should be considerable.

It will be apparent at once that the system illustrated in Fig. 5 may dispense with the vacuum reserve tank or chamber.

It will be noted in Fig. 5 that filters are provided in the air lines to protect the valve and the check valve. Also the position of the check valve is such that feed back through the pump cannot enter the system provided the check valve functions properly; and, being protected by filters, the check valve should operate effectively for a considerable time before leakage of dust through the filters results in an accumulation sufficient to render operation of the check valve unsatisfactory.

The handle 69 may be utilized simultaneously to actuate the valve aand the main switch MS. Thus the operation of locking the cover member with respect to the pan portion of the printing frame may simultaneously set the printing frame out of communication with the atmosphere and into communication with the pump, and effect energization of the motor for driving the pump. Also, accordingly, the operation of unlocking the cover member with respect to the pan portion of the printing frame may simultaneously set the printing frame into communication with the atmosphere and out of communication with the pump, and effect deenergization of the motor for driving the pump. As the locking and unlocking of the cover member requires but a single manual operation, evacuation of the printing frame may be initiated and ended with a minimum of delay and with considerable ease.

A second embodiment of the invention is illustrated in Figs. 6 through 8. This embodiment comprises a contact printing apparatus including, as a unit mounted on a common main frame, a vacuum printing frame and means for evacuating the same. Various features incorporated in this embodiment are also included in other embodiments described herein. Certain refinements shown and described in the present printing frame may, of course, be made part of the printing frame of the first embodiment described above. No light source is shown in connection with this second embodiment, but it will be readily understood that any suitable light source may be used, and the light source may or may not be mechanically connected with the printing frame and evacuation means structures, as desired.

The printing frame of the second embodiment, like printing frame of the first embodiment, is pivotally mounted on its main frame whereby the printing frame may be horizontally positioned for convenient loading and unloading and vertically positioned for printing. While the cover member of the printing frame first described is hingedly mounted on the related pan portion, the cover member of the present printing frame is mounted on the main frame for vertical movement relative to the pan portion while both the cover and said portion are horizontally disposed. When the cover is lowered into engagement with the pan portion and the printing frame is sealed and locked, the frame may swing into a vertical position, as will be seen.

The main frame of the second embodiment is designated, in its entirety, 200. A rear elevational view of the main frame is seen in Fig. 6. The main frame may, of course, be mounted on casters so that the apparatus may be trundled about a work floor. The main frame is a skeletal structure, as indicated in the figure mentioned above, and comprises a rectangular base made up of like transverse elements 201 and 202 (indicated in dotted lines), and like longitudinal elements 203 and 204. Both of the lastnamed elements are partly broken away to avoid obscuring parts of the printing frame. A standard 205 and a similar standard 206 respectively rise from the two front corners (obscured in Fig. 6) of the rectangular base; and much shorter standards 207 and 208 respectively rise from the two rear corners of said base. A horizontal brace 209 extends across the back of the main frame from the top of standard 207 to the top of standard 208, the brace being partly broken away in Fig. 6. Other horizontal braces 210 and 211 (indicated in dotted lines), substantially the size and shape of transverse elements 201 and 202 of the base, extend respectively from the top of standard 207 to standard 205, and from the top of standard 208 to standard 206. The tops of the relatively tall frontal standards 205 and 206 may be assumed to be tied together by another horizontal brace not shown in the drawing (it will be noted that the extreme upper portions of standards 205 and 206 are erased in Fig. 6).

The elements 201 through 211 of the present main frame are preferably of tubular steel stock of rectangular cross section welded together.

The printing frame 212 of the second embodiment comprises a structure which is functionally much like a vacuum pan, and a cover member the major part of which is a sheet of transparent glass. The basic, or pan, portion of the printing frame comprises a rigid fenestrated rectangular frame 213. On each side of frame 213 is a bracket 214 which rigidly supports a horizontally disposed stub shaft 215. The stub shafts 215, which are coaxial, extend outwardly from the centers of the left and right sides of the frame 213, as indicated in dotted lines in Fig. 6. The stub shaft 215 to the left in the drawing is rotatably received in a pillow block, or the like, 216 mounted on the front of standard 205; and the other stub shaft 215, to the right, is rotatably received in another pillow block, or the like, 217 mounted on the front of standard 206. Thus the frame 213 and parts secured thereto may swing on a horizontal axis. Two screws 218 are adjustably mounted on the horizontal brace 209, to the left and right respectively, as shown in Fig. 6. In this figure the printing frame is shown in vertical or printing position, but dotted lines in the figure indicate its relative horizontal position. When the printing frame is horizontally disposed, as for loading and unloading, the frame 213 contacts, and in part rests upon, the heads of screws 218, such heads operating as detents and gages for insuring horizontality of frame 213. Other detents and gages for insuring verticality of the printing frame are provided. Mounted on the lower portion of standard 205 is a bracket 219 supporting an adjustable screw 220; and mounted on the lower portion of standard 206 is another bracket 221 supporting an adjustable screw 222. The heads of the screws 220 and 222 are directed toward the front of the apparatus, and are therefore not visible in Fig. 6. When the printing frame is swung into printing position the frame 213 contacts and is arrested by the heads of screws 220 and 222.

Rigidly mounted on the frame 213 are several (here six) members which extend across the fenestration of the frame, these members being indexed 223 through 228, from left to right, in Fig. 6. All such members are channels with their openings toward the front of the apparatus when the printing frame is vertically disposed. See members 227 and 228 in cross section in Fig. 7. When the printing frame is in printing position the members 223 through 228 extend from the top to the bottom of frame 213.

A rigid fenestrated rectangular frame 229, having slightly less periphery than the fenestration of frame 213, as shown in Fig. 6, is mounted, within the last-named fenestration, on members 223, 225, 226, and 228 by means of screws 230 which are driven into frame 229 but pass freely through suitable bores in the members last named. Surrounding each screw 230 between one of these members and frame 229 is a compression spring 231 which urges the frame 229 away from said members. In other words, the frame 229 is urged toward the cover member of the printing frame when said frame is sealed or in position to be sealed. Mounted within the fenestration of frame 229, and necessarily, therefore, within the fenestration of frame 213, is a rigid rectangular sheet 232 which is secured to members 224 through 227. The means for securing sheet 232 to its supporting members is the same as that for securing frame 229 to its supporting members: a number of screws 230, each driven into sheet 232 and passed freely through suitable bores provided in members 224 through 227, and surrounded by compression springs 231 between said sheet and its supporting members, are employed. All springs 231, including both those relating to frame 229 and those relating to sheet 232, urge said frame and said sheet in the same direction, i. e., toward the cover member when the same and the pan portion of the printing frame are brought together. Sheet 232 is smaller in periphery than frame 229, as shown best in Fig. 6, wherein the periphery of the sheet is indicated by arrows extending from reference numerals 232 in the upper lefthand corner of the figure. Sheet 232 is reinforced primarily by flanges 233 formed by bending the marginal portions of the sheet (see Fig. 6; a flange 233 is shown in part, much enlarged, in Fig. 7). Sheet 232 is also reinforced by various cross members 234 and 235, the firstnamed being rods and the secondnamed being flanged channels. See Fig. 6. It will be understood that the frame 229 and the sheet 232, which are independently and resiliently mounted on their related members of the group comprising members 223 through 228, may respond independently to pressure brought to bear upon their related springs 231. Together the frame 229 and the sheet 232 comprise the base of the pan proper of the pan portion of the printing frame, which is to say that these elements provide support for other elements adapted to engage the glass of the cover member for the purpose of forming a hermetically sealed envelope for carrying transparencies and sheets of sensitized material. See below. Those surfaces of frame 229 and sheet 232 which are horizontal when the frame 213 is in loading and unloading position, and vertical when the printing frame is in printing position, are normally coplanar (see the righthand portion of Fig. 7, in which figure it will be understood that the visible fragment of frame 229 is above, and therefore partly obscures, the visible fragment of sheet 232 with its reinforcing flanges 233). In Fig. 7, to the right, is the only illustration of the manner in which frame 229 and sheet 232 are resiliently mounted on their related members of the group 223 through 228; herein the mounting between one corner of frame 229 and member 228, and between one corner of sheet 232 and member 227, is shown.

Mounted on that surface of sheet 232 which forwardly disposed when the printing frame is in printing position is a cushion 236, which may be a rectangular pad of sponge rubber or other suitable material. Mounted on the same surfaces of frame 229 and of said cushion is a blanket 237 of resilient material. The blanket, of course, is of greater size than the cushion, and the former is peripherally secured to the frame 229 by a number of screws 237a, only one of which is seen, and that in Fig. 7. See Fig. 9, wherein a nearly equivalent structure involving a base, cushion, and blanket for a pan portion of a printing frame is diagrammatically illustrated. The blanket is preferably a sheet of rubber having a corrugated surface for supporting photographic materials and for resisting sliding motion thereof. The marginal portion of the blanket 237 is but little obscured by other members in Fig. 6 and is visible between the inner edges of frame 229 and the outer edges of sheet 232. The cushion 236 is preferably cemented or otherwise attached to sheet 232 to prevent relative sliding movement between the two members; but the blanket 237 is not required to be attached in any way to the cushion. Assuming the frame 213 to be horizontally disposed, the blanket, peripherally secured to frame 229, merely overlays the cushion.

The effect of the cushion is to urge the nonmarginal portion of the blanket away from the sheet 229, and, in fact, to belly the nonmarginal portion of the blanket even in the presence of atmospheric pressure approximately into the position such portion assumes in the presence of subatmospheric pressure when the printing frame is sealed. This latter condition is assumed to exist in Fig. 7. Mounted on that surface of the blanket away from sheet 229 is a continuous marginal bead 238 (Fig. 7; a better illusration of a substantial equivalent is provided by Fig. 9). It will be shown presently that the glass of the cover member contacts and somewhat depresses the bead 238 when the printing frame is sealed.

When the printing frame is sealed a hermetically sealed envelope is provided between the glass of the cover member, the bead, and the nonmarginal portion of the blanket. Compare Fig. 9, which clearly illustrates the gist of the construction.

The cover member of the second embodiment comprises a rigid fenestrated rectangular frame 239, substantially the same as frame 213 of the pan portion. Both frames 213 and 239 may be made of tubular steel stock of rectangular cross section welded together.

The fenestration of frame 239 is covered by a rigid sheet 240 of light-transmitting material, preferably transparent glass, the sheet 240 being mounted on the surface of frame 239 which is disposed outwardly in Figs. 6, 7, and 8. Consequently the sheet 240 is totally obscured in Fig. 6; and is shown only in part in Fig. 8. The relative position only of the cover member is indicated by dotted lines in Fig. 8, the section 8—8 of Fig. 6. The glass sheet does not actually engage frame 239, being separated therefrom by thin felt or other resilient strips 241 (Fig. 7); and the glass sheet is held in place by a plurality of clamps 242 mounted on frame 239 (see Figs. 6 and 7).

The cover member of the present embodiment is adapted to move vertically with respect to the pan portion on standards 205 and 206. This arrangement for separation and joining together the cover member and the pan portion has been adopted in the second embodiment of the invention as apparatus built in accordance therewith is ordinarily of considerable size and weight, and a hinged mount for the cover member on the pan portion would be undesirably hazardous. When the present cover member is raised, it, as well as the pan portion, is horizontally disposed; and easy access to the latter for loading and unloading photographic materials is provided. A manually operable elevator mechanism is provided whereby the cover member may be raised and lowered with ease. It will be shown subsequently that when cover member and the pan portion are separated neither can be swung out of the horizontal.

Suitable guides, not shown, are provided on standards 205 and 206 for shoes, or the like, attached to frame 239, and mechanism provided for elevating and lowering this frame. In dotted lines in Fig. 6 the relative positions of frames 213 and the pan portion and frame 239 of the cover member of the printing frame, when the last-named frame is sealed and horizontally disposed, are indicated. When the cover member is lowered into engagement with the pan portion the shoes of frame 239 disengage the guides of standards 205 and 206, and the sealed printing frame, as a unit, may be swung from horizontal to vertical position. It will be shown hereinafter that until the cover member is locked in closed or sealing position with respect to the pan portion no swinging motion of the printing frame may take place. Further it will be shown that unless the printing frame is horizontally disposed it cannot be unsealed: in other words, the cover member cannot be separated from the pan portion while the printing frame is out of the horizontal.

Mounted on the rear or under side of frame 213 are two pairs of oppositely disposed pillow blocks 243 and 244, and 245 and 246. Journaled in pillow blocks 243 and 244 is a shaft 247; and journaled in pillow blocks 245 and 246 is another shaft 248. Both shafts extend across the frame 213 (from top to bottom, as in Fig. 6). Mounted on and keyed to the ends of shaft 247 are latches 249 and 250 (top and bottom, respectively, Fig. 6); and mounted on and keyed to the ends of shaft 248 are latches 251 and 252 (top and bottom, respectively, Fig. 6). All latches are substantially alike. Latches 249 and 251 are shown, much enlarged, in Fig. 7, which is an enlarged fragmentary top plan view of the second embodiment of the contact printing apparatus with the printing frame in vertical or printing position. Mounted on frame 239 are four studs 253, each adapted to be engaged by one of the latches 249 through 252 when the printing frame is locked in sealed position. All studs 253 are obscured in Fig. 6; but two are shown in Fig. 7. Mounted on and keyed to shaft 248 is a handle 254. Latches 249 and 251 are pivotally connected together by a bar 255; and latches 250 and 252 are pivotally connected together by another bar 256 (both bars shown in Fig. 6; bar 255 shown in part, and enlarged, in Fig. 7). The relative positions of the handle 254, latches 249 and 251, and bar 255 obtaining when the printing frame is sealed and locked are shown in solid lines in Fig. 7. In dotted lines in the same figure the relative positions of the handle, latches, and bar, when the cover member is not locked to the pan portion, are also shown. Of course it will be immediately apparent from the drawing that operation of handle 254 actuates all latches 249 through 252 simultaneously.

Also mounted and keyed on shaft 248 are two cantilevers 257 and 258, and another latch 259, all shown in Fig. 6. Cantilever 257 and latch 259 are shown, much enlarged, in Fig. 7; and cantilever 258 is shown, much enlarged, in Fig. 8.

Mounted at the top (in Fig. 6) of frame 213 is a bracket 260 supporting a switch which is actuated by cantilever 257. The switch is not shown, but a push button or like element by means of which the switch may be operated appears in Fig. 7, and is designated 261. In this figure the cantilever 257, shown in solid lines, is in that position it assumes when handle 254 is in locking position (also shown in solid lines; see above); and it will be noted that the outer end of cantilever 257 is in engagement with element 261 of the switch, the latter being assumed to be closed. The function of the switch is to start and top a motor for driving a vacuum pump (see below).

Mounted at the bottom (in Fig. 6; see, also, Fig. 8) of frame 213 is a valve 263. The valve, the function of which is discussed subsequently, has a gated port for communication with the atmosphere, and a filter 264 is provided for this port (Figs. 6 and 8). Valve 263 is provided with a plunger 265 by means of which the valve is operated, the plunger 265 normally extending out of the valve casing farther than is shown in Fig. 8. Near the outer end of cantilever 258 and slidably mounted thereon is another plunger 266 having a head 267 adapted to engage the end of plunger 265. A compression spring 268 surrounding plunger 266 and bearing against the head 267 and the outer portion of cantilever 258 tends to force the head 267 away from the cantilever so that the relationship of parts is as indicated in dotted lines in Fig. 8. When the handle 254 is moved into locking position, as shown in solid lines in Fig. 7, the head 267 of plunger 266 engages the end of plunger 265 of valve 263. This action, of course, results in movement of plunger 265 relative to valve 263 and also in movement of plunger 266 relative to cantilever 258. However, the plunger 265 is maintained in the position shown in Fig. 8 under pressure, due to spring 268.

Mounted on horizontal brace 209 of the main frame of the apparatus is a stud 269, indicated as a dotted circle in both Fig. 6 and Fig. 7. The stud 269 is engaged by latch 259 when the printing frame is brought to horizontal position, and the handle 254 is moved to nonlocking position, as shown in dotted lines in Fig. 7. The engagement between latch 259 and stud 269 serves as one safety means for maintaining horizontality of the pan portion of the printing frame when the main parts, i. e., the pan and cover, are separated, as for loading and unloading of photographic materials.

Another safety means for maintaining the frame 213, or the sealed and locked printing frame as a whole, in horizontal position is provided. This means comprises a plunger 270 having a knob 271 at one end thereof and being slidably mounted on two brackets 272 secured to frame 213 (see the upper righthand portion of Fig. 6). Between one bracket 272 and a collar 273 secured to the plunger 270 is a compression spring 274 which urges the plunger in a particular direction (downwardly in Fig. 6). When the printing frame is brought into horizontal position the end 275 of plunger 270 engages a beveled slot 276 provided on horizontal brace 209 of the main frame and which forces the plunger to retract slightly against spring 274; and immediately below the slot 276 a hole 277 is provided in brace 209 so that when the printing frame assumes true horizontality the end 275 of plunger 270 snaps into said hole, thereby releasably locking the frame in horizontal position.

Slidably passed through frame 213 (at the top and to the left as in Fig. 6) and through a pillow block 278 mounted on a bar 279 bridging members 224 and 225 (Fig. 6) is a rod 280. Mounted on and locked to the rod 280 is a truncated conical collar 281; and bearing against the collar and the pillow block, and surrounding that portion of rod 280 therebetween, is a compression spring 282. Another collar 283 is fixed on rod 280 and normally engages frame 213, as shown in Fig. 6, due to the pressure of spring 282. When the printing frame is in a position other than horizontal the position of plunger 280 relative to frame 213 and especially to latch 249 is as shown in Fig. 6. The outer (upper, in Fig. 6) end of rod 280 protrudes beyond the periphery of frame 213 and operates as a detent to prevent unlocking movement of latch 249. Consequently, due to rods 255 and 256 (above; Fig. 6), if latch 249 may not move into unlocking position, no latch of the group 249 through 252 may move. Thus when the printing frame is sealed and locked and out of horizontality the frame may not be unlocked. However, as the frame is brought into horizontal position the truncated conical collar 281 engages a cam 284 mounted on horizontal brace 209 of the main frame (to the left in Fig. 6), and this engagement effects an axial throw of rod 280 resulting in withdrawing the rod out of the path of latch 249. Once the printing frame is in a truly horizontal position the frame may be unlocked.

The second embodiment of the invention is specifically illustrated as a contact printing apparatus having a printing frame the evacuation of which is initiated and stopped automatically respectively in response to locking and unlocking the cover member on the pan portion of the frame. This embodiment may, of course, be used with a traveling light; but no illumination means whatever are shown. The arrangements shown in Fig. 5 may be used in connection with the second embodiment, as, of course, may modifications of this and other cooperating electrical and pneumatic circuits and parts. The evacuating means for the second embodiment may be mounted on the main frame of the apparatus, if desired; and while such means are not illustrated the main frame structures of both the first and second embodiments provide ample support for mechanisms and parts required.

Fig. 9, a generally diagrammatic electrical and pneumatic arrangement for evacuating a vacuum printing frame, shows, fairly pictorially, and in section, a conventionalized printing frame structure including an upper frame having a covering sheet of glass and a lower assembly comprising a base, a cushion, and a beaded blanket. In this figure a transparency and a sensitized sheet are shown. The bead of the blanket is here particularly understandable. Fig. 9 involves the usual vacuum pump and a motor for driving it, a main switch, and a switch in series therewith and with the motor, the lastnamed switch being adapted to be actuated by the cover of the printing frame when the cover approaches and attains closed position. Here two petcocks are shown. That to the left may operate to set the frame into and out of communication with the atmosphere; the other petcock may be variously opened to govern the difficulty of evacuation and to predetermine time requirements relating to particular pressures.

Figure 10:
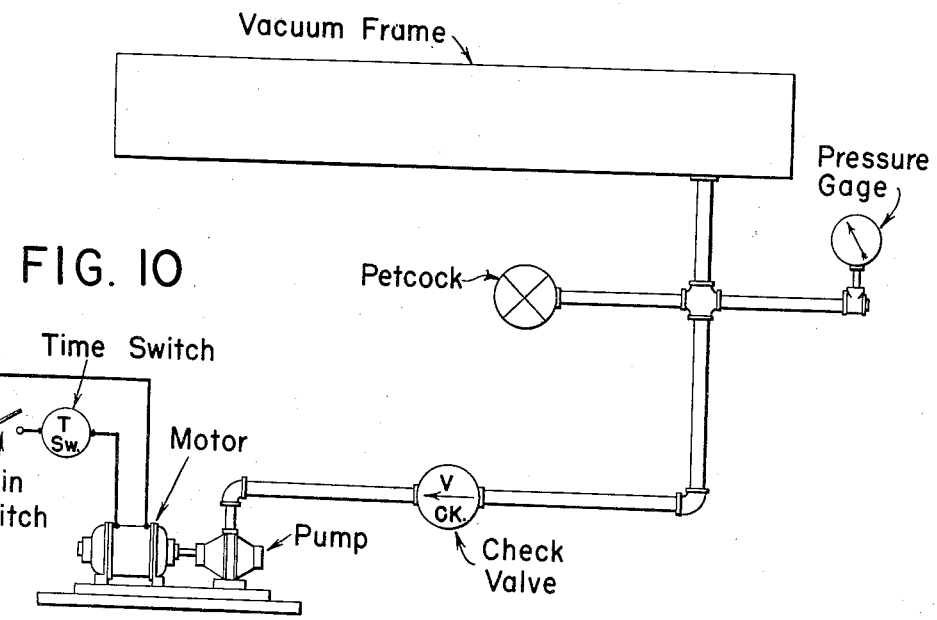

Fig. 10 shows an arrangement wherein the vacuum pump is connected to the printing frame through a check valve; a cock for setting the frame into and out of communication with the atmosphere, and a time switch for predetermining the running period of the motor for driving the pump, are also included.

Figure 11:
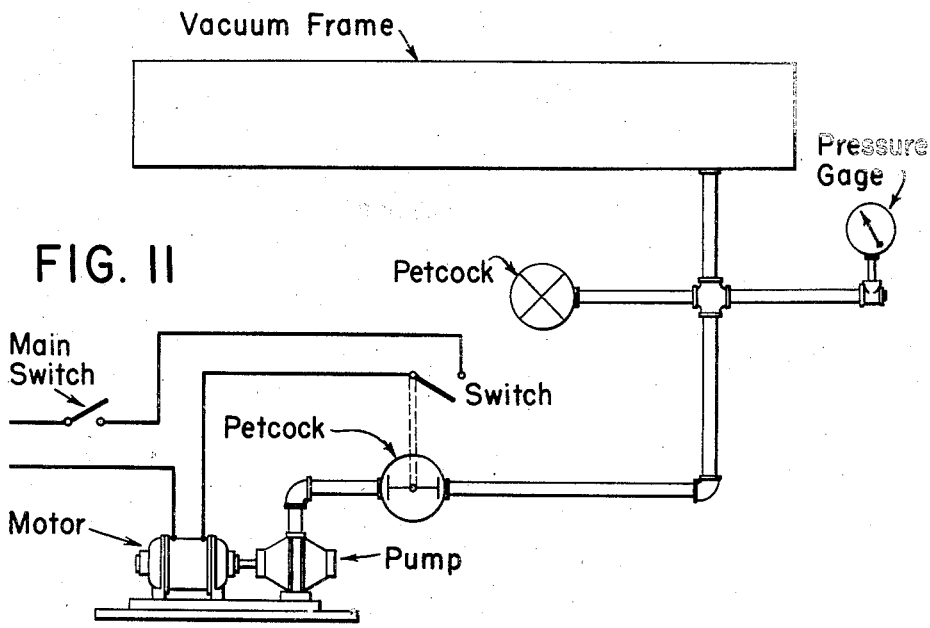

Fig. 11 shows an arrangement wherein the vacuum pump is connected to the printing frame through a petcock adapted to operate simultaneously with a switch in series with the circuit of the motor for driving a vacuum pump. The usual cock for setting the frame into and out of communication with the atmosphere is provided.

Figure 12:
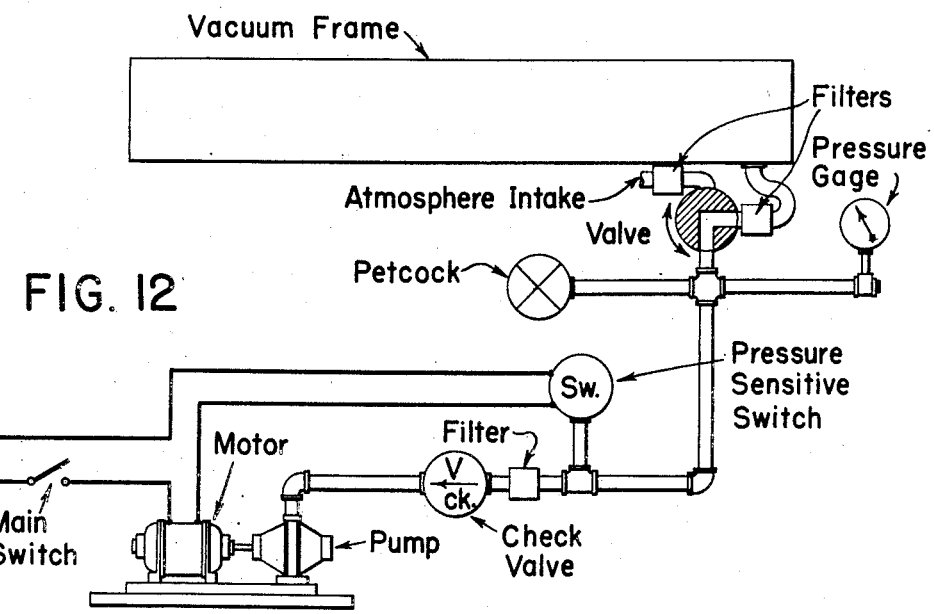

Fig. 12 shows a modification of the arrangement illustrated in Fig. 5. In Fig. 12 no vacuum reserve tank or chamber is included. A check valve and filter, as in Fig. 5, are involved, as well as another valve for alternately setting the printing frame into communication with the vacuum pump and for excluding the atmosphere, and setting the printing frame into communication with the atmosphere and for excluding the pump, an air line leading thereto, and a pressure-sensitive switch connected with the air line.

Fig. 13 shows an arrangement comprising a printing frame, a pump, a motor, and two pressure-sensitive switches either one of which may be utilized to control the motor. The switches need not be two in number, but each switch is adapted to close at a particular pressure which is different from that pressure relating to the actuation of any other switch. Also the pressure sensitive switches may be cut out altogether, as Fig. 13 clearly shows. The two pressure-sensitive switches are designated PS₁ and PS₂, the frame F, and a selector switch Sw.

I claim:

1. Contact printing apparatus comprising a main frame; a vacuum printing frame pivotally mounted on said main frame, said printing frame having a sealing light-transmitting cover, and a resilient blanket for forming a hermetically sealed envelope with said cover when the latter is in closed position; means for evacuating said envelope; a cock for setting said envelope into and out of communication with the atmosphere; and means for locking said cover in closed position, said lastnamed means effecting operation of said first named means and closing of said cock when in locking position, and stopping operation of said firstnamed means and effecting opening of said cock when in nonlocking position, wherein said printing frame is automatically and releasably locked in position when disposed horizontally.

2. Contact printing apparatus comprising a main frame; a vacuum printing frame pivotally mounted on said main frame, said printing frame having a sealing light-transmitting cover, and a resilient blanket for forming a hermetically sealed envelope with said cover when the latter is in closed position; means for evacuating said envelope; a cock for setting said envelope into and out of communication with the atmosphere; and means for locking said cover in closed position, said lastnamed means effecting operation of said first named means and closing of said cock when in locking position, and stopping operation of said firstnamed means and effecting opening of said cock when in nonlocking position, wherein said printing frame may be disposed horizontally for loading and unloading and vertically for printing; and including means for releasably locking said printing frame in a horizontal position, and other means for releasably locking said printing frame in a vertical position.

3. Contact printing apparatus comprising a main frame; a vacuum printing frame pivotally mounted on said main frame, said printing frame having a sealing light-transmitting cover, and a resilient blanket for forming a hermetically sealed envelope with said cover when the latter is in closed position; means for evacuating said envelope; a cock for setting said envelope into and out of communication with the atmosphere; and means for locking said cover in closed position, said lastnamed means effecting operation of said first named means and closing of said cock when in locking position, and stopping operation of said firstnamed means and effecting opening of said cock when in nonlocking position, wherein said printing frame may be disposed horizontally for loading and unloading and vertically for printing; and including means for releasably locking said printing frame in a horizontal position when its cover is unlocked, said means being actuated by said means for locking said cover in closed position when said lastnamed means are inoperative as a lock for said cover; and other means for releasably locking said printing frame in a vertical position.

4. Contact printing apparatus comprising a main frame; a vacuum printing frame pivotally mounted on said main frame, said printing frame having a sealing light-transmitting cover, and a resilient blanket for forming a hermetically sealed envelope with said cover when the latter is in closed position; means for evacuating said envelope; a cock for setting said envelope into and out of communication with the atmosphere; and means for locking said cover in closed position, said lastnamed means effecting operation of said first named means and closing of said cock when in locking position, and stopping operation of said firstnamed means and effecting opening of said cock when in nonlocking position, wherein said printing frame may be disposed horizontally for loading and unloading and vertically for printing, and wherein said means for evacuating said envelope comprise a pump and a motor for driving said pump; and including an electric light for illuminating said printing frame, and a latch for releasably locking said printing frame in vertical position, said latch being actuated by a solenoid in series with said light.

5. Contact printing apparatus comprising a main frame; a vacuum printing frame pivotally mounted on said main frame, said printing frame having a sealing light-transmitting cover, and a resilient blanket for forming a hermetically sealed envelope with said cover when the latter is in closed position; means for evacuating said envelope; a cock for setting said envelope into and out of communication with the atmosphere; and means for locking said cover in closed position, said lastnamed means effecting operation of said first named means and closing of said cock when in locking position, and stopping operation of said firstnamed means and effecting opening of said cock when in nonlocking position, wherein said printing frame may be disposed horizontally for loading and unloading and vertically for printing; and including means for maintaining said cover in closed position when said printing frame is disposed otherwise than horizontally, said means automatically preventing movement of said means for locking said cover in closed position when said printing frame is moved from a horizontal position.

6. Contact printing apparatus comprising a main frame; a vacuum printing frame pivotally mounted on said main frame, said printing frame having a sealing light-transmitting cover, and a resilient blanket for forming a hermetically sealed envelope with said cover when the latter is in closed position; means for evacuating said envelope; a cock for setting said envelope into and out of communication with the atmosphere; and means for locking said cover in closed position, said lastnamed means effecting operation of said first named means and closing of said cock when in locking position, and stopping operation of said firstnamed means and effecting opening of said cock when in nonlocking position, wherein said printing frame may be disposed horizontally for loading and unloading and vertically for printing; and including a means of illuminating said printing frame through said cover when said printing frame is vertically disposed, said means comprising a vertically disposed linear light source mounted on said main frame and movable horizontally in parallelism with the plane of said printing frame.

7. Contact printing apparatus comprising a main frame; a vacuum printing frame pivotally mounted on said main frame whereby said printing frame may be disposed horizontally for loading and unloading and vertically for printing, said printing frame having a light-transmitting cover hingedly mounted thereon, and a resilient blanket for forming a hermetically sealed envelope with said cover when the latter is in closed position; means for evacuating said envelope; a cock for setting said envelope into and out of communication with the atmosphere; means for locking said cover in closed position, said lastnamed means effecting operation of said firstnamed means and closing of said cock when in locking position, and stopping operation of said firstnamed means and effecting opening of said cock when in nonlocking position; a linear light source rollably mounted on said main frame for movement from side to side thereof normally with respect to the longitudinal dimension of said source and parallel to and transversely with respect to said printing frame when the latter is vertically disposed; and means for moving said light source.

8. The contact printing apparatus of claim 7 wherein said light source comprises an elongated gaseous arc light; and including a reflector for said light; and means for energizing said light, said means comprising a constant voltage transformer whereby intensity of said light is maintained at a particular value during said movement.

9. The contact printing apparatus of claim 7 wherein said light source comprises a vertically disposed elongated gaseous arc light mounted within a reflector; and wherein said means for moving said light source comprises a chain loop connected to said reflector and meshing with a sprocket at each side of said main frame, and a variable-speed motor for driving one sprocket; and including racks extending from side to side of said main frame, and pinions mounted on said reflector and engaging said racks for maintaining verticality of said light source as it is moved from side to side of said main frame.

10. The contact printing apparatus of claim 7 wherein said light source comprises a vertically disposed elongated gaseous arc light mounted within a reflector; and wherein said means for moving said light source comprises a chain loop connected to said reflector and meshing with a sprocket at each side of said main frame, and a variable-speed motor for driving one sprocket; and including means for stopping and for reversing said motor when said light source reaches either side of said main frame; and means for energizing said light, said lastnamed means comprising a constant voltage transformer.

11. The contact printing apparatus of claim 7 wherein said light source comprises a vertically disposed elongated gaseous arc light mounted within a reflector; and including means for energizing said light, said means comprising a constant voltage transformer; and two limit switches, one at each side of said main frame, each limit switch being actuated in response to the arrival of said light source adjacent thereto, and each limit switch, when actuated, operating to effect stoppage and reversal of said motor.

References Cited in the file of this patent

UNITED STATES PATENTS

| | | |
|---|---|---|
| 612,550 | Schwarz | Oct. 18, 1898 |
| 1,096,640 | Noetzel | May 12, 1914 |
| 1,246,620 | Levy | Nov. 13, 1917 |
| 1,688,059 | Sack | Oct. 16, 1928 |
| 2,170,622 | Sussin | Aug. 23, 1939 |
| 2,210,726 | Mazzocco | Aug. 6, 1940 |
| 2,257,581 | Ulsheimer | Sept. 30, 1941 |
| 2,287,271 | Powers | June 23, 1942 |
| 2,374,469 | Wekeman | Apr. 24, 1945 |
| 2,427,923 | Reynolds | Sept. 23, 1948 |
| 2,594,920 | Halpern | Apr. 29, 1952 |

FOREIGN PATENTS

| | | |
|---|---|---|
| 4,790 | Great Britain | Oct. 28, 1909 |